United States Patent
Jin et al.

[11] Patent Number: 6,138,244
[45] Date of Patent: Oct. 24, 2000

[54] TIMING RECOVERY WITH MINIMUM JITTER MOVEMENT

[75] Inventors: Gary Q. Jin, Kanata; Gordon J. Reesor, Russell, both of Canada

[73] Assignee: Mitel Corporation, Kanata, Canada

[21] Appl. No.: 09/163,248

[22] Filed: Sep. 30, 1998

[30] Foreign Application Priority Data

Oct. 24, 1997 [GB] United Kingdom ............... 972238

[51] Int. Cl.[7] .................. G06F 1/12; G06F 1/04
[52] U.S. Cl. ............................. 713/400; 713/500
[58] Field of Search ................... 713/400, 500, 713/503

[56] References Cited

U.S. PATENT DOCUMENTS

| | | |
|---|---|---|
| 4,866,739 | 9/1989 | Agazzi et al. |
| 4,975,913 | 12/1990 | Watanabe et al. ............ 370/112 |
| 5,208,672 | 5/1993 | Konishi et al. ............. 358/150 |
| 5,644,595 | 7/1997 | Yamasaki et al. |
| 5,650,954 | 7/1997 | Minuhin .................. 364/825 |
| 5,946,351 | 8/1999 | Ariyavisitakul et al. ..... 375/233 |

FOREIGN PATENT DOCUMENTS 0 153 107  8/1985  European Pat. Off. .

*Primary Examiner*—Reba I. Elmore
*Assistant Examiner*—Rita Ziemer
*Attorney, Agent, or Firm*—Marks & Clerk

[57] ABSTRACT

A symbol synchronization and timing recovery method for stabilizing jitter in a data receiver is provided. A one tap LMS algorithm is used for a pre-cursor estimate. A dead zone is set around the desired timing location and the local clock in the receiver is updated only if the timing signal is outside of the dead zone.

14 Claims, 2 Drawing Sheets

TIMING RECOVERY WITH MINIMUM JITTER MOVEMENT

FIELD OF THE INVENTION

This invention relates to data communications systems and more particularly to a system and method for symbol synchronization and timing recovery at a data receiver in such communications systems.

BACKGROUND

Data communication systems conventionally employ a transmitter at the source or sending location and a data receiver at the destination or receiving end. In order to maintain synchronization of the data signal between the source and destination it is common to transmit, with the data signal, a timing reference generated by the transmitter. The data receiver uses this reference signal to synchronize its local clock (receiver clock).

Symbol synchronization or timing recovery is an important aspect of data communication systems. Typically, the receiver clock is adjusted constantly so that the sampling position is always optimized at the point where the data detection signal-to-noise ratio (SNR) is maximized and the data eye is opened wide. The clock adjustment should also be made often enough so that the local clock can always track any change of the reference clock. On the other hand, constant changing of the local clock can make the local data transmission very unstable, and cause a jitter movement, i.e. the local data transmission rate varies around the nominal rate. Timing jitter on the receive clock has a significant influence on system performance.

A commonly used procedure in timing recovery systems is to estimate the pre-cursor, which represents the interference of the next future bit to the current receiving bit, using a correlation method. The sampling location is set at the point where the ratio between the main tap (the desired signal amplitude) and the pre-cursor is equal to a certain value. The correlation is often calculated by averaging a certain number of samples in a time window. Because the timing should be adjusted fast enough to track the timing variation, the averaging window for the correlation estimation cannot be too large as otherwise it will not give an accurate estimation of pre-cursor. The jitter stabilization is limited by the averaging window length, which further depends on the frequency offset between the reference clock frequency and the frequency of the local clock.

In the present invention, the timing location is estimated accurately so that the jitter is stabilized. A simple one tap Least Mean Square (LMS) algorithm is used for the pre-cursor estimation. The estimation is then used to set a dead zone around the desired timing location. The timing is updated only if the signal is outside of the dead zone. Therefore, only noise which is large enough to move the sampling location out of the dead zone can cause jitter movement. As a result, jitter is reduced and in the system simulations, no jitter movement has been observed.

Many timing recovery methods have been used previously in data communications systems. The most common one is to first estimate the pre-cursor $a_{-1}$ and then set the timing location to where the value $a_{-1}$ is at a certain level below the main tap $a_0$. If the pre-cursor is too small, the local clock should slow down. Otherwise, it should speed up. To keep up with the reference clock frequency, the local clock should be adjusted constantly, either to slow down or to speed up. The constant adjustment will make the local clock very unstable and a large jitter may be introduced, especially when SNR is low.

In most applications, the pre-cursor is estimated by calculating the correlation between the two adjacent bauds or symbols. To track the frequency offset between the local clock and the reference clock, the timing adjustment should be made often and hence not enough bauds can be used for the average in the correlation calculation. In many cases, only 10 to 100 bauds may be available for the averaging calculation. As a result, the pre-cursor tends to be very inaccurate, especially under a noisy environment. This will make the recovered clock very unstable and hence cause a large jitter movement in the local data transmission.

It will be apparent that more input data will give a more accurate pre-cursor estimation. Also, the pre-cursor estimation should be output sufficiently often to track the reference clock. One way to accomplish both the accuracy and the output rate of the pre-cursor estimate is to recursively change the pre-cursor estimation with every sample input by using the information of all previous data. The problem with this adaptive algorithm is that the future bit is not yet available.

SUMMARY OF THE INVENTION

In the present invention the precursor is estimated with a simple algorithm. A dead zone method is combined with an accurate precursor estimation to give almost zero jitter movement for the system.

Therefore in accordance with a first aspect of the present invention there is provided in a data transmission system having a transmitter with means to transmit a reference timing signal with a data signal and a data receiver having a local clock, a method of stabilizing the local clock in relation to the reference timing signal. The method comprises the steps of: a) adaptively estimating a pre-cursor timing location of the reference signal at a time t–T using a one tap LMS algorithm where t equals the current time and T equals one baud interval; b) establishing a dead zone covering timing locations according to the value of the pre-cursor; and c) adjusting the local clock only when the timing location falls outside of the dead zone.

According to a second aspect of the present invention there is provided in a data receiver having a local timing clock a system for stabilizing the local clock utilizing a reference timing signal extracted from data bits transmitted by a remote transmitter, the system comprising: means to estimate a pre-cursor at t–T where t equals the current time and T equals 1 baud interval; means to generate a timing dead zone covering timing locations according to the value of the pre-cursor; and means associated with the local clock to adjust the timing thereof when a sampling instant moves outside of the dead zone.

BRIEF DESCRIPTION OF THE DRAWINGS

The invention will now be described in greater detail having reference to the attached drawings wherein.

DETAILED DESCRIPTION OF THE INVENTION

In accordance with the present invention, it is proposed to postpone the aforementioned pre-cursor adaptation process until one baud later, i.e., the pre-cursor estimate is adapted at time t−T instead of at time t, where t is the current time and T is the baud interval. The adaptation algorithm used is the common Least Mean Square (LMS) algorithm with single tap, i.e..

$$a_{-1} = a_{-1} + \mu(e(t-T) - b_t a_{-1}) sgn(b_t)$$

where $b_t$ is the received data at time t, $\mu$ is the step size and $$e(t) = s(t) - \sum_{k=0}^{N} a_k b_{t-k}$$

is the error output from the ordinary adaptive decision feedback equalizer at time t, with which all the interference from the past data (post-cursor ISI) has been canceled. In the above equation s(t) is the received signal.

The above pre-cursor estimation takes all previous samples into account and is much more accurate than one calculated taking the average of only 10 to 100 bauds.

The idea of the new timing algorithm for the jitter reduction is to set a dead zone in which the timing sampling instant does not change. In such a way, only noise which is large enough to move the timing instant out of the dead zone can cause a wrong timing movement.

Figure 1:
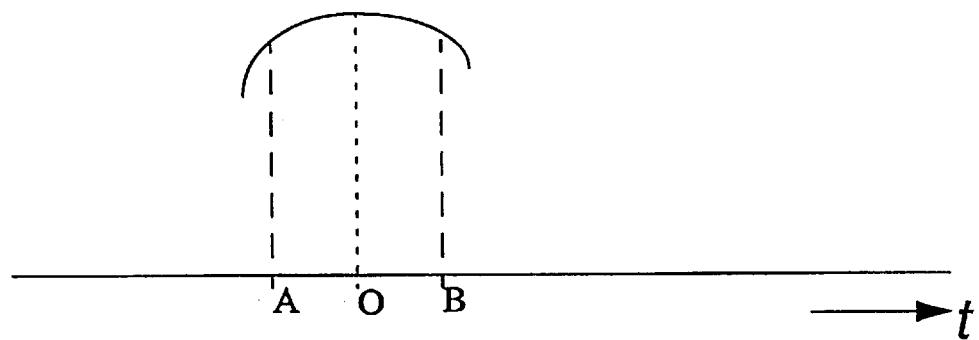
FIG. 1. illustrates the timing dead zone.

FIG. 1 shows a timing dead zone between boundaries A and B. Assuming that the desired timing location is at point O, two constraints around the position O are set for both point A and point B, based on the system requirements. At every timing adjustment moment, both of the constraints are tested. If the result lies inside the dead zone, no timing adjustment is required or made. If the result falls outside of the dead zone, a timing adjustment is required. If the sampling instant is found to be on the left hand side of point A, then constraint A is not met, and the receive clock is slowed down with a small adjustment so that the sampling position will move inside the dead zone. If the sample lies on the right hand side of constraint B, constraint B is not met, and the receive clock should be increased to move the sampling position inside the dead zone.

The setting of the dead zone boundaries is a function of the system design, and affects the total channel impulse response. In general, if the dead zone is large, jitter is more stable (larger noise amplitude is required to move the sample position outside of the dead zone). On the other hand, the detection SNR will decrease. This is because, although in almost all cases the position which yields the maximum detection SNR lies inside the dead zone, the detection SNR is mainly determined by the smallest SNR amongst all the possible sample positions inside the dead zone. If the local clock has a small frequency offset with respect to the reference clock, the sampling position will eventually move toward one of the boundaries, either A or B, depending on whether the local clock is fast or slow. Therefore, most of the time, the system will work around the boundaries (A or B). Amongst all the sampling positions inside the dead zone, it is most likely that the detection SNR is the smallest around the dead zone boundaries. If the dead zone is large, the dead zone boundary is extended and the detection SNR will be reduced. A suitable dead zone is set based on the system requirements and the desired sampling location.

Some decision feedback equalization (DFE) algorithms may have their own constraints. The dead zone must be first confined to these constraints and is hence bounded by them. Although the constraints imposed by the DFE algorithm can be used as the dead zone constraints, it has been found that in most cases, the dead zone is too wide with these constraints. Under such circumstances, it may be possible to use the DFE algorithm imposed constraints as the boundaries for the dead zone, and set the timing dead zone to be a small interval inside these constraints.

With a timing dead zone, no noise-related jitter movement was found in all the system simulations, and when the local clock has a frequency offset, the timing algorithm can always make the right timing correction.

Figure 2:
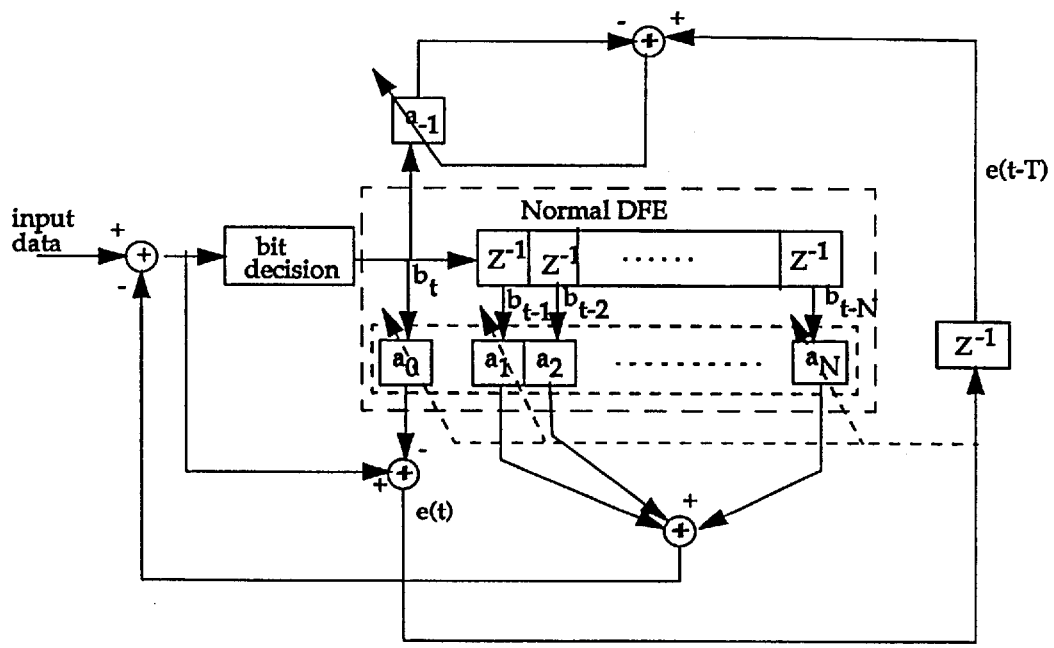
FIG. 2 is a block diagram illustrating the precursor estimation implementation.

FIG. 2 is a block diagram illustrating the precursor estimation algorithm of the present invention. It can be described as an extension of an ordinary Decision Feedback Equalizer (DFE) algorithm. The bit decision function gives out the current data estimation $b_t$, which is sent into a N length data memory. The coefficients $a_0$ to $a_N$ are updated with the DFE output error signal $$e(t) = s(t) - \sum_{k=0}^{N} a_k b_{t-k}$$

using the normal LMS algorithm. The precursor is updated with the delayed error signal e(t−T) subtracting $a_{-1} b_t$. When the precursor is obtained, the typical constraints for the dead zone as shown in FIG. 1 will be:

Constraint A: $a_0 < 8 a_{-1}$

Constraint B: $6 a_{-1} < a_0$

This means that the receive clock is slowed down if $a_0 > 8 a_{-1}$ and the receive clock is sped up if $6 a_{-1} > a_0$.

Figure 3:
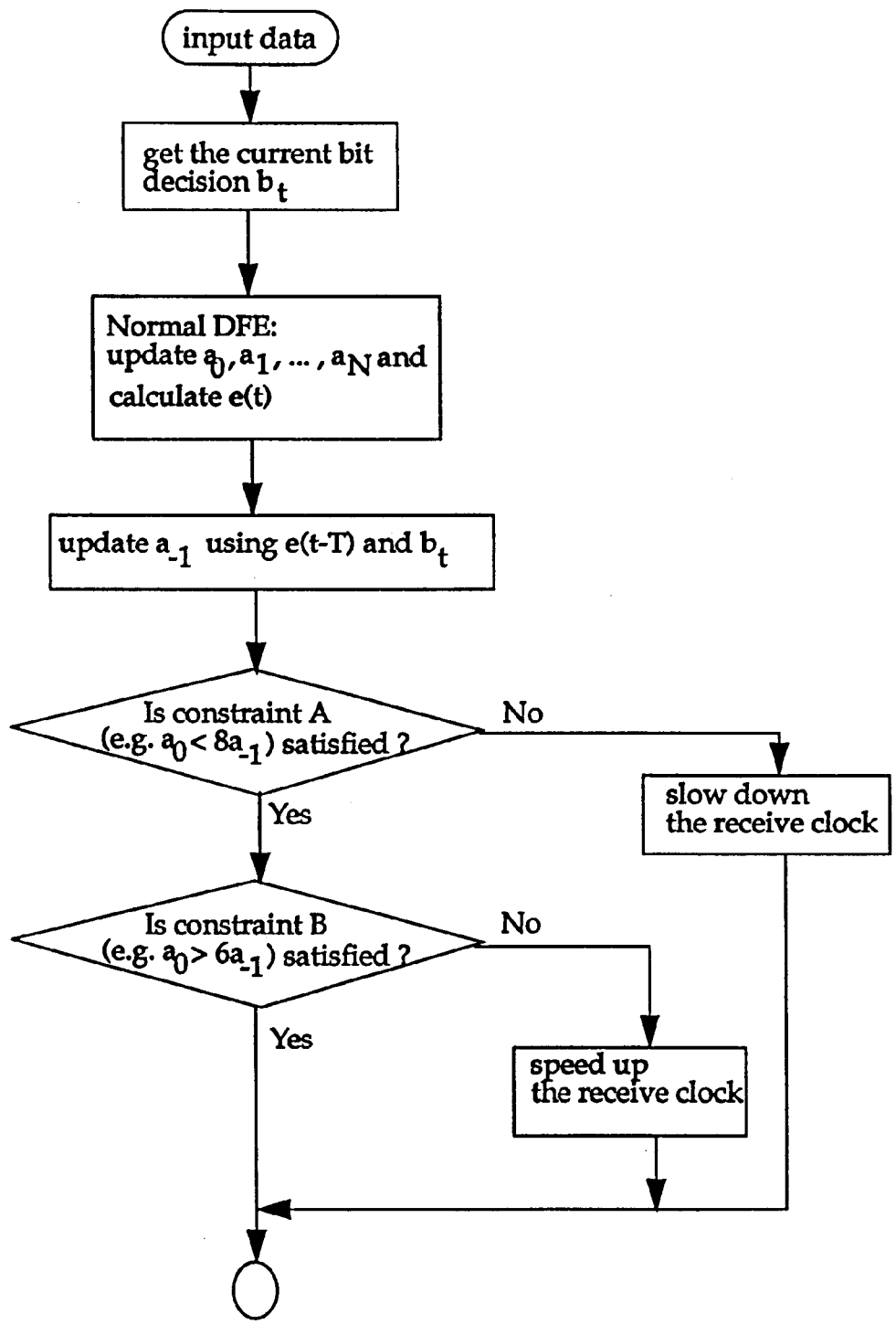
FIG. 3 is a flow chart showing the timing recovery process.

FIG. 3 is a flow chart showing the process steps in implementing the timing recovery algorithm of the present invention.

Although one embodiment of the invention has been described and illustrated it will be apparent to one skilled in the art that various changes can be made to the basic concept. It is to be understood, however, that such changes will fall within the scope of the invention as defined by the appended claims.

GLOSSARY OF TERMS

The following definitions will be of assistance in the understanding of the foregoing description:

| | |
|---|---|
| ISI | Inter-symbol Interference in the data transmission. It is the interference of other data bits to the current receiving bit due to the channel effect. |
| Post-cursor | Inter-symbol interference caused by previous data bauds, due to the channel impulse response. |
| Pre-cursor | Inter-symbol interference caused by future bauds in the channel but not yet received by the receiver. |
| DFE | Decision Feedback Equalizer. The adaptive algorithm used to cancel the ISI in the data transmission. |
| LMS algorithm | Least Mean Square algorithm. A commonly known adaptive filter technique. |

What is claimed is:

1. A method of stabilizing a timing sampling location for deriving, at a data receiver, a timing recovery signal from a received reference signal in a data communications system comprising the steps of:

a) adaptively estimating a pre-cursor timing sampling location of said reference signal b) determining a dead zone including timing sampling locations based on said precursor estimate; and c) adjusting timing recovery of said receiver clock only when said timing sampling location falls outside of said dead zone.

2. A method as defined in claim 1 wherein said pre-cursor timing sampling location is estimated using a one tap least mean square algorithm.

3. A method as defined in claim 2 wherein the timing sampling location estimate is calculated at t−T where t is the current time and T is a one baud interval.

4. A method as defined in claim 3 wherein said dead zone is based on a decision feedback equalization algorithm.

5. A method as defined in claim 4 wherein said timing sampling location has boundaries which fall within said dead zone.

6. A method as defined in claim 1 wherein said pre-cursor timing sampling location is estimated recursively on the basis of all previous timing estimates.

7. In a data transmission system having a transmitter for transmitting a reference timing signal with a data signal and a data receiver having a local clock, a method of stabilizing a sampling location of said data signal for deriving a timing recovery signal for the local clock from the reference timing signal comprising the steps of:
   a) adaptively estimating a pre-cursor timing location of said reference signal at time t−T using a one tap least mean square (LMS) algorithm where t=current time, T=1 baud interval;
   b) determining a dead zone including timing locations based on said precursor estimate; and
   c) adjusting the local clock only when said timing location falls outside of said dead zone.

8. A system for stabilizing a timing sampling location at a receiver clock for deriving a timing recovery signal from a received timing reference signal in a data communication system comprising:
   means at said receiver clock to adaptively estimate a pre-cursor timing location;
   means to generate a timing dead zone including timing sampling locations based on said precursor estimate; and
   means associated with said receiver clock to adjust the timing thereof only when said timing sampling location moves outside of said dead zone.

9. A system as defined in claim 8 for use in a data transmission system having a transmitter and a receiver.

10. A system as defined in claim 9 wherein said timing reference signal is provided by said transmitter.

11. A system as defined in claim 10 wherein said means to adaptively estimate a pre-cursor timing location includes means to implement a single tap least mean square (LMS) algorithm.

12. A system as defined in claim 11 wherein said means to adaptively estimate a pre-cursor timing location includes means to implement a decision feedback equalization algorithm.

13. A system as defined in claim 8 wherein said dead zone has boundaries on either side of said timing location.

14. A system as defined in claim 13 wherein said dead zone boundaries are established by a decision feedback equalization algorithm.

* * * * *